United States Patent [19]

Anderson et al.

[11] 4,129,681

[45] Dec. 12, 1978

[54] COATING COMPOSITIONS COMPRISING ALKOXYMETHYLAMINOTRIAZINES, POLYOLS AND POLYHYDROXY OLIGOMERS

[75] Inventors: George J. Anderson, East Longmeadow; Timothy F. Desmond, Longmeadow; J. Owen Santer, East Longmeadow, all of Mass.

[73] Assignee: Monsanto Company, St. Louis, Mo.

[21] Appl. No.: 733,976

[22] Filed: Oct. 20, 1976

[51] Int. Cl.$^2$ .................. C08L 61/28; C08L 33/08
[52] U.S. Cl. ................................. 428/524; 260/849; 260/850; 260/856; 260/823; 427/385 R; 427/388 A; 428/460; 528/246; 528/258; 528/254; 528/351; 528/350; 528/361
[58] Field of Search .............. 260/849, 850, 67.6 R, 260/856; 427/385 R, 388 A; 428/524

[56] References Cited

U.S. PATENT DOCUMENTS

| | | | |
|---|---|---|---|
| 3,928,265 | 12/1975 | Dhein et al. | 260/850 |
| 3,959,201 | 5/1976 | Chang | 260/850 |
| 3,980,732 | 9/1976 | Isaksen et al. | 260/850 |
| 4,022,726 | 5/1977 | Zabrocki et al. | 260/850 |

*Primary Examiner*—John C. Bleutge
*Attorney, Agent, or Firm*—R. Bruce Blance; W. J. Farrington; J. C. Logomasini

[57] ABSTRACT

Coating compositions comprising alkoxymethylaminotriazines, polyols and polyhydroxy oligomers which are useful for low temperature cure, are low in viscosity to allow ease of coating without the need for appreciable amounts of solvent thinners, and provide coatings free from the problems of crawling, cratering, pinholing and "orange peel" formation. The alkoxymethylaminotriazines are preferably alkoxymethylmelamines. The polyols are polymethylol cyclohexanes containing from 2 to 4 methylol groups. The polyhydroxy oligomers are polyesters or acrylic resins. The compositions may be cured in the presence of acid catalysts in the temperature range of 70° to 105° C.

17 Claims, No Drawings

COATING COMPOSITIONS COMPRISING ALKOXYMETHYLAMINOTRIAZINES, POLYOLS AND POLYHYDROXY OLIGOMERS

BACKGROUND OF THE INVENTION

1. Field of the Invention

This invention relates to coating compositions comprising a polyol, an oligomeric hydroxy compound and an aminoplast and in particular relates to coating compositions comprising a polymethylol cyclohexane, an oligomeric hydroxy compound and a substantially fully etherified substantially completely methylolated polyaminotriazine.

2. Description of the Prior Art

Coating compositions comprising hydroxy polyesters and similar hydroxy containing oligomers and polymers and aminoplast curing agents are well known in the prior art. Thus, U.S. Pat. Nos. 3,449,467 and 3,668,276 disclose organic solutions of hydroxy polyesters of moderately high molecular weight, containing aminoplasts and U.S. Pat. Nos. 3,852,375, 3,920,595 and 3,959,201 disclose high solids coating compositions comprising blends of hydroxy polyesters of moderately low molecular weight and aminoplast curing agents. However, in general these compositions are cured at temperatures well in excess of 100° C. and encompass enormously wide molar ranges of hydroxy polyester to aminoplast. Moreover, they are generally high in viscosity and therefore require some water or solvent to reduce the viscosity to a level adequate for coating applications. Coating compositions of suitable viscosity for coating applications may be prepared from monomeric polyols and aminoplasts. However, many such compositions, when they are applied to substrates, tend to crawl and form coatings of non-uniform thickness, and also tend to form craters and "orange peel" defects when they are cured.

A need, therefore, exists for a high solids coating composition substantially free of solvent to provide high film build up per application, to reduce volatile pollutants evolved during the baking cycle and to improve the economics of the coating process.

A need also exists for a high solids coating composition which can be cured at lower temperatures, for example in the temperature range of 70° to 105° C. thus reducing the energy requirements for the curing process.

A need also exists for a high solids coating composition to provide smooth glossy films, which are free from the problems of crawling, cratering, pin hole formation and orange peel formation.

A need also exists for a high solids coating composition which can be formulated with hydroxy polyester oligomers and hydroxy acrylic oligomers to provide surface coating compositions which can be cured to provide coatings with good water, solvent and stain resistance.

SUMMARY OF THE INVENTION

These needs are met by a coating composition comprising a polymethylolcyclohexane containing from 2 to 4 methylol groups, a polyhydroxy polyester oligomer or a polyhydroxy acrylic oligomer of molecular weight in the range of about 200 to about 1000 and a substantially completely methylolated polyaminotriazine substantially fully etherified with at least one $C_1$ to $C_4$ alcohol, wherein the ratio of the hydroxyl groups of the polymethylolcyclohexane to the hydroxyl groups of the oligomer is in the range of about 2:1 to about 1:4 and wherein the ratio of the hydroxyl groups of the polymethylolcyclohexane and the oligomer to alkoxymethyl groups of the polyaminotriazine is in the range of about 2:1 to about 1:2.

Other aspects of the invention are directed to articles of manufacture comprising substrates coated with a film of the above coating composition cured at a suitable temperature and to the process of coating substrates with a film of the above coating composition and curing the film at a temperature in the range of 60° to 175° C.

Some of the advantages of the disclosed compositions include low temperature curability in the temperature range of 70° to 105° C. especially in the presence of an acid catalyst of pKa less than 5, thus reducing the energy requirements for cure; low viscosity to allow ease of coating without the need for appreciable amounts of solvent thinners thus allowing high film build and reducing volatile pollutants; freedom of the films from crawling which causes non-uniform film thickness; and freedom of the films from cratering, pin-holing and orange peel formation which impair the protection afforded by the coating to the substrate and detract from the appearance of the film.

PREFERRED EMBODIMENTS

Polymethylolcyclohexanes suitable for use in the present invention contain from 2 to 4 methylol groups per molecule. The polyols have a hydroxyl equivalent or weight per hydroxyl group of less than about 150. Suitable polymethylolcyclohexanes can include one or more of the following: 1,2-dimethylolcyclohexane, 1,3-dimethylolcyclohexane, 1,4-dimethylolcyclohexane, 1,2,4-trimethylolcyclohexane, 1,3,5-trimethylolcyclohexane, 1,2,4,5-tetramethylolcyclohexane, and the like. The polymethylolcyclohexane or mixture of polymethylolcyclohexanes is preferably liquid at a temperature of 50° C. so that blends with the other components of the coating composition yield coating compositions which are liquid at room temperature and which are substantially free from separation of a solid or semisolid phase. Methylol cyclohexanes which melt above 50° C. can be selected so that their blends are liquid at the desired temperature. The preferred methylol compounds include 1,2-dimethylolcyclohexane, 1,3-dimethylolcyclohexane, and 1,4-dimethylolcyclohexane. 1,4-Dimethylolcyclohexane is especially preferred since it yields coating compositions which cure to provide films of excellent gloss, hardness, humidity resistance and stain resistance.

The polyhydroxy polyester oligomer is of molecular weight in the range of about 200 to about 1000 and is prepared by esterification of at least one diol or polyol with at least one dicarboxylic or polycarboxylic acid and in general should have an average functionality of about 1.7 or more reactive hydroxyl or carboxyl groups per molecule. Suitable polyesters are disclosed in U.S. Pat. Nos. 3,449,467, 3,852,375 and 3,959,201 which are incorporated herein by reference. Polyhydroxy acrylate and methacrylate oligomers are prepared by copolymerization of hydroxy monomers such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate and the like with α, β-ethylenically unsaturated monomers such as the acrylic and methacrylic esters of $C_1$ to $C_8$ aliphatic alcohols, acrylic acid, methacrylic acid, styrene, acrylonitrile, methacrylonitrile, ethylene, vinyl chloride and the like, in the presence of a free radical initiator such as benzoyl peroxide, lauroyl peroxide and the like and a chain transfer agent such as lauryl mercaptan and the like to provide oligomers of molecular weight less than 1000 containing at least 2 hydroxyl groups and preferably not more than six hydroxyl groups per molecule.

The polyaminotriazine component of the liquid composition is substantially completely methylolated and substantially fully etherified with at least one $C_1$ to $C_4$ alcohol. Suitable polyaminotriazines contain at least two amino groups per triazine ring and include formoguanamine, acetoguanamine, benzoguanamine, melamine and the like. They are reacted with formaldehyde to methylolate the amino groups and are then alkylated or etherified by reaction with the $C_1$ to $C_4$ alcohol or mixture of alcohols to provide unmixed or mixed ethers. These crosslinking agents can be prepared by the method set forth in U.S. Pat. No. 2,998,411. The etherified methylolated aminotriazines are liquid and are essentially monomeric or at most are oligomeric with an average degree of polymerization of no more than about 2, the aminotriazine rings being joined by methylene or methylene ether bridges formed by condensation of two methylol groups. Thus, the etherified aminotriazines within the scope of the invention possess a ratio of aminotriazine to combined formaldehyde in the range of about 1 : 2n − 0.5 to about 1 : 2n where n is the number of amino groups per triazine ring and possess a ratio of aminotriazine to alkyl ether groups in the range of about 1: 2n − 1 to about 1 : 2n. The preferred aminotriazine is melamine since it has three amino groups per ring and is potentially hexafunctional. The preferred ethers are methyl ethers because they tend to be more reactive at low temperature and because they generate a relatively small amount of condensation volatiles during the crosslinking reaction with the polyol component of the liquid composition. Thus, the more preferred aminotriazine compounds are the methoxymethyl melamines in which the ratio of melamine to combined formaldehyde is in the range of 1 : 5.5 to 1 : 6 and the ratio of melamine to methoxy groups is in the range of 1 : 5 to 1 : 6. Among the more preferred aminotriazine compounds is monomeric hexamethoxymethyl melamine. A discussion of the concepts of methylolation and etherification is set forth in U.S. Pat. No. 3,471,388 which patent is incorporated herein by reference.

The liquid compositions of the present invention comprising the polymethylolcyclohexane, the polyhydroxy oligomer and the aminotriazine components described hereinabove contain a ratio of polymethylolcyclohexane to polyhydroxy oligomer such that the ratio of hydroxyl groups of the polymethylolcyclohexane to the hydroxyl groups of the oligomer is in the range of about 2 : 1 to about 1 : 4 and the ratio of hydroxyl groups of the polymethylolcyclohexane and the oligomer to the alkoxymethyl groups of the polyaminotriazine is in the range of about 2 : 1 to about 1 : 2. Large excesses and deficiencies of aminotriazine component have been acceptable in the prior art solvent systems without detracting from film properties of the cured composition. However, when insufficient or excess aminotriazine component is used with the polymethylolcyclohexane and polyhydroxy oligomers of the present invention, the cured liquid composition is found to be undesirably soft and readily marred especially when the compositions are cured at the lower temperatures which have been achieved with the compositions of the present invention.

The liquid compositions of the present invention can be cured at temperatures in the range of 60° to 175° C. for a period of time in the range of several seconds to hours. Curing is readily effected in about 10 to 30 minutes at the lower end of the temperature range in the presence of an acid catalyst which is soluble in the liquid composition and has a pKa at 25° C. of less than 5. Among the acids which can be used are the mineral acids and sulfonic acids such as methanesulfonic acid, benzenesulfonic acid, and the toluenesulfonic acids. A preferred catalyst is p-toluenesulfonic acid since it is readily available, relatively non-volatile and easily dissolved in the liquid composition. Sufficient catalyst to provide the desired rate of cure at a selected temperature without causing excessively short pot-life is used. Generally from about 0.1 to about 10 percent is sufficient. For a satisfactory cure rate in the temperature range of 70° to 105° C., from about 0.2 to about 1 percent of catalyst provides undiluted liquid compositions with a pot-life or shelf-stability of 7 days or more at 25° C. Dilution with solvent can extend the storage stability almost indefinitely.

In addition to the components above, the compositions can contain other optional ingredients including various pigments, fillers, plasticizers, antioxidants, flow control agents, wetting agents and other agents of the type ordinarily used in surface coatings.

For improved flexibility of the cured composition, a polyoxypropylene triol of molecular weight in the range of 500 to 1000 can be added to the blend. The triols may be prepared by the base catalyzed addition of propylene oxide to triols such as trimethylolethane, trimethylolpropane, glycerol, 1,2,6-hexanetriol and the like.

The compositions can be applied to paper, cloth, metal, wood, glass and plastic substrates by any convenient method such as brushing, dipping, spray, roller coating, dip coating, etc. The ability to cure at low temperature is particularly advantageous with paper, cloth and wood substrates.

The invention will be further described and illustrated in the examples which follow. The examples are illustrative of the invention and should not be construed as limiting the scope of their details. All parts and percentages are by weight unless otherwise indicated.

EXAMPLE A

PREPARATION OF POLYHYDROXY POLYESTER OLIGOMER

592 Parts phthalic anhydride, 2196 parts benzoic acid, 2760 parts neopentyl glycol, 804 parts trimethylolpropane and 1040 parts 1,5-pentanediol are charged to a kettle. 150 Parts xylene and 46 parts methanesulfonic acid are added. The mixture is stirred with gentle heating until a clear melt is obtained. 1752 Parts adipic acid is charged, and heating is continued until azeotropic distillation begins at about 120° C. Heat input to the flask is adjusted to obtain a slow azeotropic separation of water (∼ 825 parts) over 10–12 hours. The batch temperature varies between 120°–132° C. during this period. When the acid number falls below 10.0, the solvent xylene is removed by vacuum distillation. Yield = 8000 parts (hydroxyl equivalent ∼ 180, molecular weight ∼ 330).

EXAMPLE 1

36 Parts of 1,4-dimethylolcyclohexane is melted at 50° C. and is blended with 120 parts of a methoxymethylmelamine in which the melamine to combined formaldehyde ratio is 1:5.7, and the melamine to methoxy ratio is 1:5.0, and the methoxy content is 14.3 meq. per gm. The blend is cooled to room temperature and 100 parts of an 87 weight percent solution of a polyhydroxy polyester of hydroxyl equivalent of 150 and 30 parts of a 20 weight percent solution of p-toluenesulfonic acid in isopropyl alcohol are added to provide a liquid blend containing 75 weight percent of reactive components.

The blend is applied to a bonderized No. 37 steel panel with a 75 micron coating blade to provide a dried film thickness of approximately 25 micron after it has been baked for 30 minutes at 93° C. The baked film has a pencil hardness of 2H (ASTM D 3363-74), a solvent resistance of 200+ rubs, excellent water spot resistance and humidity rating of 9.5 D, measured in a Cleveland Condensing Humidity Cabinet at 45° C. The solvent resistance is determined by oscillating a Control-Flo Fountain Marking Pencil manufactured by Diagraph-Bradley Industries, Inc., containing a felt tip of approximately 1 cm diameter and filled with methyl ethyl ketone, on the coating surface using a uniform moderate pressure. The number of double strokes required to erode the film and cause break through to the metal is noted. The water spot test is carried out by adding a 0.05 ml drop of distilled water to the surface of the coating and covering the spot with a watch glass. After 4 hours at room temperature the spot is examined for blistering, swelling, or whitening. If these effects are absent the film is considered free of water damage.

A similar blend, containing twice as much p-toluenesulfonic acid, baked at 82° C., yielded films of H hardness, solvent resistance of 200+, and humidity rating of 9.5 D.

EXAMPLES 2 - 5

Liquid blends are prepared in the manner and from the raw materials set forth in Example 1 to provide a series containing various ratios of aminoplast, 1,4-dimethylolcyclohexane and polyhydroxy polyester. The ratios are presented in Table I. Properties of coatings after a 30 minute bake at 82° C. illustrate a decline in performance when high levels of aminoplast are used.

TABLE I

Blends Of 1,4-Dimethylolcyclohexane, Methoxymethylmelamine Polyhydroxy Polyester, pbw

| Example | 1,4-Dimethylol-cyclohexane | Methoxymethyl Melamine | Polyhydroxy Polyester |
|---|---|---|---|
| 2 | 36 | 40 | 100 |
| 3 | 36 | 60 | 100 |
| 4 | 36 | 90 | 100 |
| 5 | 36 | 150 | 100 |

TABLE 2

Properties Of Coatings Prepared From Blend Examples 1-5

| Example | Pencil Hardness | solvent Resistance | Water Spot Test |
|---|---|---|---|
| 1 | H | 200+ | pass |
| 2 | 2H | 200+ | pass |
| 3 | 2H | 200+ | pass |
| 4 | H | 200+ | pass |
| 5 | F | 70 | slight blush |

EXAMPLES 6 - 9

For comparative purposes, liquid blends are prepared in the manner set forth in Example 1 with the aminoplast and polyhydroxy polyester of Example 1 and a series of diols. The compositions and coating properties determined on films baked at 82° and 93° C. are presented in Table 3 and illustrate the superiority of films based on 1,4-dimethylolcyclohexane (Example 1) in comparison with aliphatic diols, ether diols and ester diols.

TABLE 3

Blends Of Diol, Methoxymethyl Melamine and Polyhydroxy Polyester, pbw

| Example | Diol, pbw | Methoxymethyl Melamine | Polyhydroxy Polyester |
|---|---|---|---|
| 6 | DMHP-DMHP, 49.7 | 120 | 100 |
| 7 | 1,5-pentanediol, 26 | 120 | 100 |
| 8 | 2-methyl-2,4-pentane-diol, 29.5 | 120 | 100 |
| 9 | dipropylene glycol, 33.5 | 120 | 100 |

| Bake Cycle, 30 Mins. 82° C. | Pencil Hardness | Solvent Resistance | Humidity Rating |
|---|---|---|---|
| Example 1 | H | 200+ | 9.5D |
| Example 6 | H | 100 | 8 D |
| Example 7 | H | 200 | 6 D |
| Example 8 | F | 60 | 6 D |
| Example 9 | H | 200 | 5 D |
| Bake Cycle, 30 mins. 93° C. | | | |
| Example 1 | 2H | 200 | 9.5 D |
| Example 6 | H | 100 | 8 D |
| Example 7 | F | 200 | 7 D |
| Example 8 | F | 80 | 6 D |
| Example 9 | F | 160 | 6 D |

DMHP—DMHP = 2,2-dimethyl-3-hydroxypropyl 2,2-dimethyl-3-hydroxypropionate

EXAMPLE 10

This example sets forth the preparation of a liquid coating composition containing 1,4-dimethylolcyclohexane, a polyhydroxy polyester of hydroxyl equivalent of 150, and polyether polyol of hydroxyl equivalent 233 formed by reaction of propylene oxide with 1,2,6-hexametriol and a methoxymethylmelamine in which the melamine to combined formaldehyde ratio is 1:5.7 and the melamine to methoxy ratio is 1:5.0, and the methoxy content is 14.3 meq. per gm.

90 Parts of 1,4-dimethylolcyclohexane is melted at 50° C. and is blended with 15 parts of the polyether polyol and 145 parts of the methoxymethylmelamine. The blend is cooled to room temperature and 860 parts of an 87 weight percent solution of the polyhydroxy polyester and 35 parts of a 20 weight percent solution of p-toluenesulfonic acid in isopropyl alcohol are blended in. The blend is applied to bonderized No. 37 steel panels and is evaluated as described in Example 1. After a 30 minute bake at 93° C. the coating has a hardness rating of F, a forward impact strength of 52 cm-kg. (ASTM D 2794-69), a solvent resistance of 120, and is heavily stained by wet mustard in contact for 24 hours.

EXAMPLES 11-14

A series of blends of the components set forth in Example 10 are prepared in the manner set forth in Example 10. The coating properties are evaluated after 30 minutes baking at 93° and 104° C. respectively and are compared in Table 4 with similar coatings from Example 10. The data show that when the ratio of hydroxyl groups to methoxy groups is greater than 2:1 as in Example 10, the solvent and stain resistance are low.

TABLE 4
COMPARISON OF COATINGS CONTAINING POLYETHER POLYOL

|  | Example 10 | Example 11 | Example 12 | Example 13 | Example 14 |
|---|---|---|---|---|---|
| Reactants, Wt. % |  |  |  |  |  |
| 1,4 CHDM | 9.0 | 14.4 | 16.2 | 18.0 | 19.8 |
| Polyhydroxy polyester | 75.0 | 60.0 | 55.0 | 50.0 | 45.0 |
| Polyether polyol | 1.5 | 2.4 | 2.7 | 3.0 | 3.3 |
| Methoxymethylmelamine | 14.5 | 23.2 | 26.1 | 28.0 | 30.8 |
| Bake Cycle, 30 mins. 93° C. |  |  |  |  |  |
| Pencil Hardness | F | H | 2H | 4H | 4H |
| Forward Impact, cm-kg. | 52 | 58 | 52 | 39 | 35 |
| Solvent Resistance, MEK rubs | 120 | 200+ | 200+ | 200+ | 200+ |
| Mustard stain 24 hours | heavy | heavy | moderate | moderate | moderate |
| Bake Cycle, 30 mins. 104° C. |  |  |  |  |  |
| Pencil Hardness | H | 3H | 6H | 6H | 7H |
| Forward Impact, cm-kg. | 35 | 37 | 29 | 29 | 29 |
| Solvent Resistance, MEK robs | 190 | 200+ | 200+ | 200+ | 200+ |
| Mustard stain, 24 hours | heavy | very slight | very slight | very slight | very slight |

EXAMPLE 15

This example sets forth the preparation and evaluation of a composition containing a hydroxy acrylic oligomer.

684 Parts of 1,4-dimethylolcyclohexane is dissolved in 3750 parts of a 70 weight percent solution of a hydroxy acrylic resin in toluene sold by Ashland Oil Co. under the tradename Arolon 557 and the solution is blended with 1085 parts of a methoxymethylmelamine in which the ratio of melamine to combined formaldehyde is 1:5.8 and the ratio of melamine to methoxy is 1:5.3 and with 31 parts of p-toluenesulfonic acid in 620 parts of isopropyl alcohol. The liquid blend contains 71 weight percent of reactive components. The blend is coated and evaluated as described in Example 1. The cured film obtained after a 30 minute bake at 82° C. has a pencil hardness of 3H, a forward impact of 35 cm-kg., a solvent resistance of 200+, and an excellent water spot resistance.

EXAMPLES 16 - 19

These examples are set forth to show the improvement in properties of pigmented coatings when 1,4-dimethylolcyclohexane is included in the coating composition (Examples 17-19) in comparison with Example 16 which contains no 1,4-dimethylolcyclohexane. The compositions and data are set forth in Table 5. The polyhydroxy polyester has a hydroxyl equivalent of 150; the polyester polyol is a propylene oxide adduct of 1,2,6-hexanetriol with a hydroxyl equivalent of 233 and the methoxymethylmelamine has a melamine to combined formaldehyde ratio of 1:5.7, a melamine to methoxy ratio of 1:5.0 and a methoxyl content of 14.3 meq. per gm.

TABLE 5
COMPARISON OF PIGMENTED COATINGS

|  | Ex. 16 | Ex. 17 | Ex. 18 | Ex. 19 |
|---|---|---|---|---|
| Coating Composition |  |  |  |  |
| 1,4-dimethylolcyclohexane | — | 2.50 | 4.91 | 6.04 |
| polyether polyol | —10 | 0.42 | 0.82 | 1.01 |
| methoxymethylmelamine | 6.25 | 4.02 | 7.92 | 9.72 |
| polyhydroxy polyester | 18.46 | 18.46 | 18.46 | 18.46 |
| p-toluene sulfonic acid | 0.43 | 0.43 | 0.53 | 0.59 |
| titanium dioxide | 24.67 | 24.67 | 24.67 | 24.67 |
| solids, % | 83.9 | 83.7 | 83.9 | 83.9 |
| Bake Cycle, 30 mins. 121° C. |  |  |  |  |
| Pencil Hardness | 3H-4H | H | 7H | 7H |
| Forward Impact, cm-kg. | 63 | 29 | 23 | 23 |
| Solvent Resistance, MEK rubs | 200+ | 200+ | 200+ | 200+ |
| Mustard stain, 24 hours contact | slight | moderate | none | none |
| Bake Cycle, 30 mins. 104° C. |  |  |  |  |
| Pencil Hardness | 2H | H | 3H | 6H |
| Forward Impact, cm-kg. | 63 | 35 | 37 | 29 |
| Solvent Resistance, MEK rubs | 200+ | 190 | 200+ | 200+ |
| Mustard stain, 24 hours contact | slight | heavy | very slight | very slight |
| Bake Cycle, 30 mins. 93° C. |  |  |  |  |
| Pencil Hardness | F | F | H | 2H |
| Forward Impact, cm-kg. | 52 | 52 | 58 | 52 |
| Solvent Resistance, MEK rubs | 200 | 120 | 200+ | 200+ |
| Mustard stain, 24 hour contact | heavy | heavy | heavy | moderate |

What is claimed is:

1. A coating composition comprising a blend of 1,4-dimethylolcyclohexane, a polyhydroxy oligomer of molecular weight in the range of about 200 to about 1000 selected from the group consisting of polyesters, polyacrylates and polymethacrylates, and a substantially completely methylolated polyaminotriazine substantially fully etherified with at least one $C_1$ to $C_4$ alcohol and from about 0.1 to about 10 weight percent of a soluble acid catalyst of pKa less than about 5, wherein the ratio of the hydroxyl groups of the 1,4-dimethylolcyclohexane to the hydroxyl groups of the oligomer is in the range of about 2:1 to about 1:4 and wherein the ratio of the hydroxyl groups of the 1,4-dimethylolcyclohexane and the oligomer to the alkoxymethyl groups of the polyaminotriazine is in the range of about 2:1 to about 1:2.

2. The coating composition of claim 1 wherein the polyaminotriazine is selected from the group consisting of benzoguanamine and melamine.

3. The coating composition of claim 1 wherein the polyaminotriazine is melamine and the alcohol is methyl alcohol.

4. The coating composition of claim 1 wherein the acid catalyst is a sulfonic acid.

5. A coating composition comprising a blend of 1,4-dimethylolcyclohexane, a polyhydroxy polyester oligomer of molecular weight in the range of about 200 to about 1000 and a substantially completely methylolated polyaminotriazine substantially fully etherified with at least one $C_1$ to $C_4$ alcohol, wherein the ratio of the hydroxyl groups of the 1,4-dimethylolcyclohexane to the hydroxyl groups of the oligomer is in the range of about 2:1 to about 1:4 and wherein the ratio of the hydroxyl groups of the 1,4-dimethylolcyclohexane and the oligomer to the alkoxymethyl groups of the polyaminotriazine is in the range of about 2:1 to about 1:2.

6. The coating composition of claim 5 wherein the polyaminotriazine is selected from the group consisting of benzoguanamine and melamine.

7. The coating composition of claim 5 wherein the polyaminotriazine is melamine and the alcohol is methyl alcohol.

8. An article of manufacture comprising a substrate coated with the cured coating composition of claim 7.

9. An article of manufacture comprising a substrate coated with the cured coating composition of claim 1.

10. An article of manufacture comprising a substrate coated with the cured coating composition of claim 5.

11. A process of coating a substrate which comprises applying a film of the coating composition of claim 3 to the substrate and curing the film at a temperature in the range of about 60° to about 175° C.

12. The process of claim 4 wherein the temperature is in the range of about 70° to 105° C.

13. A process of coating a substrate which comprises applying a film of the coating composition of claim 1 to the substrate and curing the film at a temperature in the range of about 60° to about 175° C.

14. The process of claim 13 wherein the temperature is in the range of about 70° to about 105° C.

15. A process of coating a substrate which comprises applying a film of the coating composition of claim 5 to the substrate and curing the film at a temperature in the range of about 60° to about 175° C.

16. The process of claim 15 wherein the temperature is in the range of about 70° to about 105° C.

17. An article of manufacture comprising a substrate coated with the cured composition of claim 3.

* * * * *